United States Patent Office 3,496,240
Patented Feb. 17, 1970

3,496,240
ACETYLENIC CARBINOL PRODUCTION AND RECOVERY BY THIN FILM, SUPERATMOSPHERIC PRESSURE EVAPORATION WITH CONDENSER PRESSURE CONTROL BY VENTING
August Sturzenegger, Essex Fells, N.J., assignor to Hoffmann-La Roche Inc., Nutley, N.J., a corporation of New Jersey
Filed Sept. 20, 1966, Ser. No. 580,611
Int. Cl. C07c 29/00, 29/24; B01d 1/22
U.S. Cl. 260—638                                    4 Claims

ABSTRACT OF THE DISCLOSURE

Acetylenic carbinols are produced by reaction of acetylene or an acetylenic hydrocarbon with a ketone in the presence of a suitable catalyst. The reaction is carried out in a high pressure evaporator provided with a film wiper and a condenser which condenses ammonia and unreacted acetylene for recycle into the system and which is vented to regulate the pressure. The condenser is maintained at temperatures of 60° C. or below.

SUMMARY OF THE INVENTION

Figure 1:
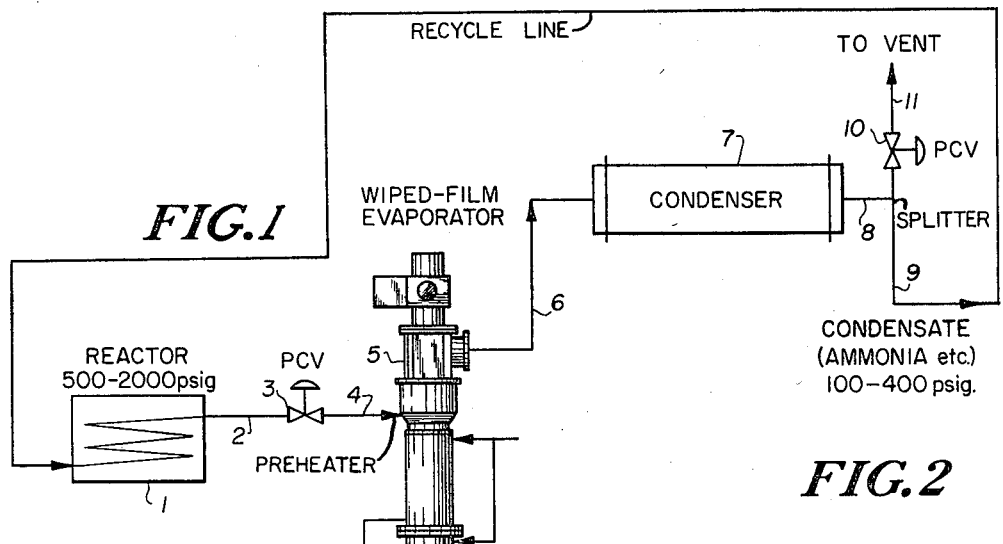
FIGURE 1 represents a schematic flow diagram.
Figure 2:
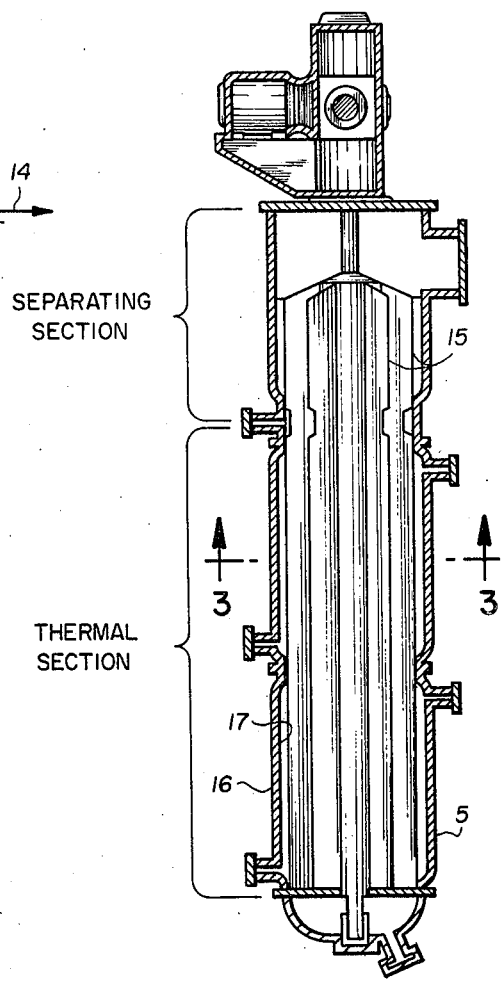
FIGURE 2 represents a schematic vertical section of the wiped-film evaporator.
Figure 3:
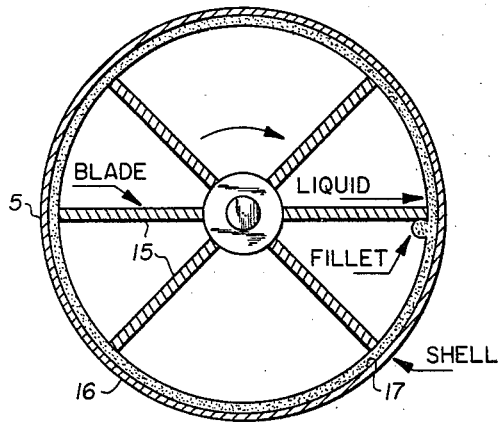
FIGURE 3 represents a schematic horizontal section of the wiped-film evaporator taken along line 3—3 of FIGURE 2.

This invention relates to a novel process. More particularly, this invention relates to an improvement in a process for producing acetylenic carbinols.

It is well known that acetylenic carbinols can be obtained by the reaction of acetylene or an acetylenic hydrocarbon with a ketone in the presence of a suitable catalyst. Suitable catalysts include, for example, alkali metal compounds. A solvent, e.g., liquid ammonia, can be employed. The process is generally conducted as follows, with reference to the drawings.

The aforesaid reactants, namely, acetylene or an acetylenic hydrocarbon, a ketone and a catalyst, e.g., sodium butynylate, are introduced into a reactor 1 together with a solvent, e.g., liquid ammonia. The employment of a solvent is not essential but is preferable. Most any solvent conventionally used for acetylene, e.g., tetrahydrofuran, acetone, liquid ammonia, etc., can be used, but liquid ammonia is preferred. The order in which the reactants are introduced into the reactor is not significant. The reaction, generally speaking, is carried out at a temperature of about −10° C. or higher and at a pressure not below about 500 p.s.i.g. In general, within the operating temperature range of −10° C. to +50° C. the pressure of the system will vary from about 500 p.s.i.g. to about 2000 p.s.i.g. or higher. When the reaction is completed, the reaction mixture is first released through a line 2 containing a pressure control valve 3 to a pressure within the range of from about 100 to about 400 p.s.i.g. The reaction mixture is then passed through a line 4 into a suitable evaporator 5. If desired, the reaction mixture prior to being introduced into the evaporator 5 can be preheated in a closed heating vessel or chamber to a temperature of from just above the temperature of the reaction mixture to about 100° C. The acetylenic carbinol and the catalyst, together possibly within some small quantities of starting ketone, ammonia and other reaction by-products, are collected through a line 12 containing a pressure control valve 13 from the evaporator in liquid state and released through a line 14. The acetylene and the major portion of the ammonia are passed from the evaporator 5 through a line 6 into a suitable condenser 7. The condensed ammonia and acetylene are then recycled into the process through a line 8 and 9.

At that stage in the afore-described reaction at which the reaction mixture is passed into the evaporator 5, the evaporator 5 must be maintained at a temperature sufficient to distill off the ammonia and acetylene. To efficiently distill off the ammonia from the acetylenic carbinol product, it is necessary to maintain the evaporator 5 at a temperature of from about 70° C. to about 120° C. However, the use of high temperature can reverse the equilibrium and lead to decomposition of the acetylenic carbinol product. To prevent decomposition, it is essential to minimize the contact time of the reaction feed in the evaporator 5.

As the reaction mixture is fed into the evaporator 5 through a line 4, a film of liquid forms on the interior surface walls 17 of that evaporator 5. The formation of that film of liquid on the interior surface walls 17 of the evaporator 5 is a natural property of liquids. The interior surface film acts as an insulator, and unless removed, necessitates that certain measures be taken to compensate for that insulating effect. Most commonly either an increase in temperature or an increase in contact time, i.e., time that the reaction mixture spends in the evaporator 5, or some combination of the two factors, would be employed. However, neither is desirable. An increase in contact time results in reversing the reaction and depressing the yield. An increase in temperature will upset the pressure balance in the reaction system and can also cause deterioration of material in the evaporator 5. Furthermore, the surface film on the interior walls 17 of the evaporator 5 will itself decompose after a relatively short while and could initiate further reaction reversal.

To minimize the contact time of the reaction mixture in the evaporator 5 and decrease the film thickness on the interior surface 17 of the evaporator 5, a film wiper 15 is employed. The film wiper 15 used herein must be adapted to work under pressure, e.g., it must have a pressure seal, thick walls, etc. Most any conventional film wiper which has been adapted for use under high pressure can be employed herein.

There is a temperature gradient across the evaporator 5 of from about 120° C. at the bottom to about 20° C. at the top. The temperature at the top of the evaporator 5 approximates the temperature at which the ammonia is to be condensed. The temperature at which ammonia is condensed determines the pressure of the evaporator 5 and the condenser 7. When the acetylene and ammonia leave the evaporator 5 and enter the condenser 7, they do so at the evaporating temperature, namely, about 20° C. or more. At atmospheric pressure, ammonia boils at −33° C., and since the vapor entering the condenser 5 is not pure ammonia but a mixture of ammonia and acetylene, to condense the ammonia necessitates condensation temperatures of considerably below −33° C.

To so condense the ammonia and acetylene mixture requires the use of extensive refrigeration equipment. Such equipment is extremely bulky, requiring the use of much space and is inordinately expensive. The space occupied by the refrigeration equipment and the cost of not only the equipment but the operation of the process employing such equipment has heretofore proven to be a serious detriment.

It has now been discovered that the condensation of the evaporated ammonia-acetylene mixture can be effected at room temperature thereby eliminating the need for any elaborate refrigeration equipment. Indeed, water from a cooling tower, which is ordinarily warmer than room temperature but which can vary from about 0° C. to about 60° C. can be employed. However, to condense the ammonia-acetylene mixture at about room temperature or higher, e.g., by means of water from a cooling tower or other source, necessitates the use of high pressure, since at about +30° C. the pressure of the acetylene-ammonia mixture is about 200 p.s.i.g.

Heretofore, it was not considered feasible to condense the acetylene-ammonia mixture at about room temperature or higher by means of high pressure for the reason that under super-atmospheric pressure the ammonia and acetylene mixture, in time, would discontinue flowing from the evaporator 5. Applicant has discovered that the use of a vent adjacent to the terminal outlet line 8 of the condenser 7 results in a continuous evaporation of the ammonia-acetylene mixture through a line 8 and 11 containing a pressure control valve 10 and leading to the vent (not pictured). The following theory, to which applicant is in no way bound, is believed to explain the reason for the efficacy of applicant's process. It is believed that the mixture entering the condenser 7 from the evaporator 5 contains not only acetylene and ammonia but also inert gases. In the course of time those inert gases build up in pressure to a point approximating the pressure at which the ammonia-acetylene mixture is entering the condenser 7 and eventually suppress the evaporation of the ammonia and acetylene. Applicant's discovery of the use of a vent adjacent to the terminal outlet line 8 of the condenser 7 to permit the escape of the inert gases was made in direct pursuit of the aforesaid theory and has resulted in a process wherein the ammonia-acetylene mixture continuously flows from the evaporator 5 even under the most intense pressure.

DETAILED DESCRIPTION OF THE INVENTION

The acetylenic carbinols produced in the practice of this invention have the formula

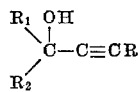

I in which the symbol R represents a member selected from the group consisting of hydrogen and lower alkyl, lower alkenyl, lower alkynyl, phenyl and lower alkyl substituted phenyl radicals; the symbol $R_1$ represents a member selected from the group consisting of lower alkyl, lower alkenyl and lower alkynyl radicals; $R_2$ represents a hydrocarbon radical having from 1 to 18 carbon atoms; and in which $R_1$ and $R_2$, taken together, represent a member selected from the group consisting of cyclo-lower alkyl and cyclo-lower alkenyl radicals.

The present process comprises reacting acetylene, or an acetylene hydrocarbon, with a ketone in the presence of a catalytic quantity of an alkali metal compound of the type described hereinafter, using liquid ammonia as a solvent for the reaction. The reaction is carried out under such temperatures and pressures as to maintain the reaction system, throughout the reaction, in a completely liquid phase. As used herein, the expression "liquid phase" is used to connote a reaction system which is wholly and entirely devoid of a vapor phase and solids. The manner in which the reaction system is maintained in a completely liquid phase will be described in the paragraphs which follow hereinafter.

In the practice of this invention, acetylene, or an acetylene hydrocarbon, having the formula $$CH \equiv CR \qquad \qquad II$$

in which the symbol R represents a member selected from the group consisting of hydrogen and lower alkyl, lower alkenyl, lower alkynyl, phenyl and lower alkyl substituted phenyl radicals is reacted with a ketone having the formula

III in which $R_1$ is a member selected from the group consisting of lower alkyl, lower alkenyl and lower alkynyl radicals; $R_2$ is a hydrocarbon radical having from 1 to 18 carbon atoms; and in which $R_1$ and $R_2$, taken together, represent a member selected from the group consisting of cyclo-lower alkyl and cyclo-lower alkenyl radicals.

The lower alkyl groups which, in Formulas I and II, are represented by the symbol R, include, for example, straight or branched chain alkyl groups containing from 1 to 7 carbon atoms, such as, methyl, ethyl, propyl, isopropyl, butyl, isobutyl, pentyl, hexyl, heptyl, etc. radicals. The lower alkenyl groups which, in Formulas I and II, are represented by the symbol R, include for example, straight or branched chain alkenyl groups containing from 2 to 7 carbon atoms, such as, ethenyl, propenyl, 1-butenyl, 2-butenyl, 1-pentenyl, 2-pentenyl, etc. radicals. The alkynyl groups which, in Formulas I and II, are represented by the symbol R include, for example, straight or branched chain alkynyl groups containing from 2 to 7 carbon atoms, such as, ethynyl, propynyl, 1-butynyl, 2-butynyl, 1-pentynyl, 2-pentynyl, 3 - methyl - 1-butynyl, etc. radicals. The lower alkyl substituted phenyl radicals which are represented in Formulas I and II by the symbol R include, for example, o-tolyl, m-tolyl, p-tolyl, etc. radicals.

The lower alkyl groups which are represented in Formulas I and III by the symbol $R_1$ include, for example, lower alkyl groups, either straight or branched chain, having from 1 to 7 carbon atoms, such as, methyl, ethyl, propyl, isopropyl, butyl, isobutyl, pentyl, hexyl, heptyl, etc. radicals. The alkenyl groups which, in Formulas I and III, are represented by the symbol $R_1$ include, for example, lower alkenyl groups, either straight or branched chain, having from 2 to 7 carbon atoms, such as, ethenyl, propenyl, 1-butenyl, 2-butenyl, 1-pentenyl, 2-pentenyl, hexenyl, heptenyl, etc. radicals. The alkynyl groups which are represented in Formulas I and III by the symbol $R_1$, include, for example, lower alkynyl groups, either straight or branched chain, having from 2 to 7 carbon atoms, such as, ethynyl, propynyl, 1-butynyl, 2-butynyl, 1-pentynyl, 2-pentynyl, 3-methyl-1-butynyl, pentynyl, hexynyl, heptynyl, etc. radicals.

The hydrocarbon radical which, in Formula I and III, is represented by the symbol $R_2$ includes aliphatic and aromatic hydrocarbon radicals, either straight or branched chain, having from 1 to 18 carbon atoms. The hydrocarbon radical may be saturated or unsaturated and substituted or unsubstituted. Thus, for example, the hydrocarbon radical can be an alkyl group having from 1 to 18 carbon atoms, such as, a methyl, ethyl, propyl, isopropyl, butyl, isobutyl, pentyl, hexyl, heptyl, octyl, nonyl, decyl, undecyl, dodecyl, tridecyl, tetradecyl, pentadecyl, hexadecyl, heptadecyl, octadecyl, etc, radical. Moreover, the hydrocarbon radical which, in Formulas I and III, is represented by the symbol $R_2$ includes alkenyl groups, either straight or branched chain, having from 2 to 18 carbon atoms, such as, ethenyl, propenyl, 1-butenyl, 2-butenyl, 1 - pentenyl, 2 - pentenyl, 2-methyl-2-pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, etc. radicals. The 4,8-dimethyl nonadien-3,7-yl group is exemplary of another hydrocarbon radical which is represented in Formulas I and III by the symbol $R_2$. Furthermore, the hydrocarbon radical which, in Formulas I and II is represented by the symbol $R_2$ includes alkylnyl groups, either straight or branched chain, having from 2 to 18 carbon atoms, such as, ethynyl, propynyl, 1-butynyl, butenyl, 1 - pentenyl, 2 - pentenyl, 2-methyl-2-pentenyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, etc. radicals. A phenyl group is exemplary of another hydrocarbon radical which, in Formulas I and III, is represented by the symbol $R_2$.

Finally, taken together, the symbols $R_1$ and $R_2$ of Formulas I and III represent cycloalkyl groups, preferably, cyclo-lower alkyl groups, such as, cyclopropyl, cyclobutyl, cyclopentyl, cyclohexyl, etc. groups or cycloalkenyl groups, preferably, cyclo-lower alkenyl groups, such as, cyclopropenyl, cyclobutenyl, cyclopentenyl, cyclohexenyl, etc. groups.

In the preferred practice of this invention, acetylene is the Formula II compound which is employed. However, acetylene hydrocarbons, such as, propyne, butyne, pentyne, vinyl acetylene, etc. can be used. Moreover, as the Formula III compound, there is preferably used acetone; methyl heptenone, i.e., 6-methylhepten-5-one-2; pseudoionone, i.e., 6,10 - dimethylundecatrien - 3,5,9 - one-2; geranyl acetone, i.e., 6,10-dimethylundecadien - 5,9 - one-2; hexahydrofarnesyl acetone, i.e., 6,10,14 - trimethylpentadecanone-2; tetrahydrofarnesyl acetone, i.e., 6,10,14-trimethyl-5-pentadecen-2-one; etc.

The process of the present invention is readily carried out. Utilizing carefully controlled reaction conditions, the nature of which will be described hereinafter, the process furnishes the compounds of Formula I in excellent yields and in a high state of purity. In carrying out the process, (1) the Formula II compound, i.e. acetylene, or an acetylene hydrocarbon, (2) liquid ammonia and (3) the catalyst are charged into a suitable reaction vessel concurrently. As the catalyst there is used an alkali metal acetylide or, in the alternative, an amount of either an alkali metal or an amide of an alkali metal which, when mixed with acetylene, or with the acetylene hydrocarbon, will react therewith to form a catalytic quantity of alkali metal acetylide. The concentration of the solution, which is thus prepared, is variable within rather wide limits. In general, however, there will be used from about 1.0 part to about 8.0 parts by weight of liquid ammonia for each part by weight of either the acetylene or acetylene hydrocarbon to be dissolved therein. In the preferred practice of the invention, there will be used from about 2.0 parts to about 5.0 parts by weight of liquid ammonia for each part by weight of the acetylene or acetylene hydrocarbon.

Thereafter, a ketone of Formula III is charged or pumped into the thus obtained liquid ammonia solution of acetylene, or acetylene hydrocarbon. The ratio of acetylene or acetylene hydrocarbon, to ketone which is present in the reaction mixture is variable. Generally, there will be provided a ratio of 1.0 mole of acetylene, or 1.0 mole of acetylene hydrocarbon, for each mole of ketone. However, the reaction system can contain an excess of acetylene, or acetylene hydrocarbon, or it can contain an excess of the ketone reactant. Substantial excesses of acetylene, acetylene hydrocarbon or ketone can be used, if desired, without unduly decreasing the efficiency of the process, since any unreacted acetylene, acetylene hydrocarbon or ketone which is present in the reaction mixture at the completion of the reaction can be recovered and reused. Additionally, the liquid ammonia solvent can be recovered after the completion of the reaction and reused.

In the foregoing description, it has been indicated that the alkali metal acetylide catalyst or, in lieu thereof, the acetylide-forming alkali metal, is charged into the reaction vessel prior to the introduction of the ketone reactant therein. It is to be understood that this particular sequence is not at all critical to the operability of the invention. If desired, the alkali metal acetylide, or the acetylide forming alkali metal compound, can be added to the system at the same time as the ketone, either in admixture with the ketone or separately, or it can be incorporated into the system after the ketone.

The alkali metal acetylide compound is present in the reaction system in catalytic amounts. Where the acetylide is produced, in situ, a sufficient quantity of alkali metal or alkali metal amide is incorporated into the system to provide a catalytic amount of the alkali metal acetylide. In general, the process has proven to be a successful means for producing high yields of high purity acetylenic carbinols when from about 0.02 mole to about 0.5 mole of alkali metal acetylide is provided for each mole of ketone present in the reaction system. While sodium acetylide is used in the preferred embodiment of the invention, acetylides of other alkali metals, such as, potassium acetylide, lithium acetylide, etc. can be used, if desired.

In an alternate embodiment of the invention, a catalyst other than an alkali metal acetylide can be employed. Thus, for example, where acetylene, or an acetylenic hydrocarbon is reacted with a ketone, in the manner described herein, to produce an acetylenic carbinol having the formula

(A)

in which the symbols R, $R_1$ and $R_2$ have the same meaning as in Formula I, there can be added to the reaction mixture, as the catalyst, a catalytic quantity of the alkali metal derivative of such compound, i.e., an alkali metal salt of an acetylenic carbinol. That is to say, the reaction can be catalyzed by means of the use of a compound having the formula

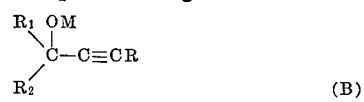

(B)

in which the symbols R, $R_1$ and $R_2$ each represent the same groups as are represented by R, $R_1$ and $R_2$ of Formula A; and in which the symbol M represents an alkali metal, such as sodium, potassium, lithium, etc.

Thus, for example, where methyl butynol, i.e. 3-methylbutyn-1-ol-3, is to be prepared by the reaction of acetylene with acetone, there can be present in the reaction system, as the catalyst, a catalytic quantity of an alkali metal methyl butynylate. Where, however, acetylene is to be reacted, for example, with a ketone, such as, methyl heptonone; geranyl acetone; or 6,10,14 - trimethyl - pentadecan - 2 - one; to produce dehydrolinalool, i.e., 3,7-dimethylocten - 6 - yne - 1 - ol - 3; dehydronerolidol, i.e., 3,7,11 - trimethyldodecadien - 6,10 - ol - 3; or dehydroisophytol, i.e., 3,7,11,15 - tetramethylhexadecyn-1-ol-3; respectively, there can be present in such reaction systems, respectively, an alkali metal dehydrolinalylate, an alkali metal dehydronerolidylate or an alkali metal dehydroisophytylate. While, in such an embodiment, the sodium compound is preferably used, for example, sodium methyl butynylate, sodium dehydrolinalylate, sodium dehydronerolidylate, sodium dehydroisophytylate, etc., the corresponding potassium or lithium compounds can be employed, if desired.

The present process is significant in that it provides a highly efficient method for obtaining valuable acetylenic carbinols. For example, the process can be utilized to prepare, in excellent yields and in a high state of purity, methyl butynol, dehydrolinalool, dehydronerolidiol and dehydroisophytol by the reaction of acetylene with acetone, methylheptenone, geranylacetone and 6,10,14 - trimethyl - pentadecan - 2 - one, respectively. Additionally, the process can be used to prepare phenyl butynol, i.e., 3 - phenyl - butyn - 1 ol - 3, or ethyl pentynol, i.e., 3-ethylpentyn-1-ol-3, by the ethynylation of acetophenone and diethyl ketone, respectively. The process can be carried out in a batchwise or in a continuous fashion, although the utilization of the invention as a continuous process is preferred. Nevertheless, whether it is carried out in a batchwise fashion or in a continuous manner, the process provides extraordinarily high yields of the acetylenic carbinols. For example, by means of this process it is common to obtain the desired acetylenic carbinols in yields in excess of about 90 percent, based on the weight of ketone used. Moreover, the acetylenic carbinol compounds which are obtained by this method are substantially free of contaminants.

The present process is characterized particularly in that it permits the distillation of ammonia and acetylene at high temperatures and under high pressure in a continuous manner. The instant process also eliminates the need for bulky, elaborate and expensive refrigeration equipment.

As already indicated, the acetylenic carbinol product is isolated in admixture with a catalyst. If desired, the reaction mixture can be obtained substantially free of a catalyst simply by neutralizing same, e.g., with carbon dioxide, and filtering the neutralized mixture.

For a fuller understanding of the nature and objects of this invention, reference may be had to the following examples which are given merely as further illustrations of the invention and are not to be construed in a limiting sense.

EXAMPLE 1

In this example, 3.970 kg. of liquid ammonia, 1.040 kg. of acetylene and 0.023 kg. of sodium were fed into a pipe reactor, by means of a positive displacement pump, at a rate of 450 grams per hour. The reactor was maintained at a temperature of 5° C. and at a pressure of 700 p.s.i.g. The quantity of sodium employed was such as to react with a portion of the acetylene present to provide 0.048 kg. of sodium acetylide. A total of 1.660 kg. of acetone was pumped into the same pipe reactor at a rate of 144 grams per hour. As the reaction was completed, the reaction mixture was released to a pressure of about 350 p.s.i.g. and heated to a temperature of about 50° C. The reaction mixture comprising 3.97 kg. of ammonia, 0.33 kg. of acetylene, 2.16 kg. of methyl butynol, 0.08 kg. of acetone and 0.15 kg. of sundries was fed into evaporator equipped with a film wiper adapted to work under high pressure. The bottom temperature of the evaporator was maintained at 118° C. and the condensation temperature at the top of the evaporator was maintained at 35° C. The pressure of the system was 215 p.s.i.g. The product, substantially pure methyl butynol, was collected as a liquid from the evaporator. The yield of methyl butynol was 95 percent, based on the weight of acetone employed. The acetylene and ammonia vapors, which were released from the evaporator, were passed into a condenser and condensed at a temperature of about 30° C. at 215 p.s.i.g. The liquid condensate collected contained 3.7 kg. of ammonia, 0.33 kg. of acetylene and 0.1 kg. of sundries. The liquid condensate was ready for recycling back into the system.

EXAMPLE 2

A feed of 48.6 kg./hour of reaction mixture containing 24 kg. of ammonia, 21 kg. of methyl butynol and 3.6 kg. sundries was pumped into a wiped film evaporator. The operating pressure was 115 p.s.i.g., the cooling temperature was +2° C. and the bottom of the evaporator was maintained at a temperature of 118° C. The product, comprising 20.6 kg. methyl butynol, 0.8 kg. ammonia and 3.6 kg. sundries was collected as liquid from the evaporator. The acetylene and ammonia vapors released from the evaporator were condensed at 20° C. and 115 p.s.i.g. The liquid condensate collected comprised 23 kg. of ammonia, 0.4 kg. sundries and was ready for recycling back into the system. The average contact time was less than 10 seconds.

EXAMPLE 3

The same reaction mixture as described in Example 2 was pumped into a wiped film evaporator but at a weight rate of 35 kg./hour. The bottom of the evaporator was maintained at 100° C. and the condensation temperature at 35° C. Cooling tower water maintained at about 30° C. was employed to condense the acetylene and ammonia vapors released from the evaporator. The average contact time was less than 10 seconds, and the decomposition of methyl butynol was less than 1 percent.

EXAMPLE 4

In this example, dehydrolinalool was prepared by the reaction of acetylene and methyl heptenone in liquid ammonia and using sodium dehydrolinalylate as the catalyst.

1.200 kg. of acetylene, 5.800 kg. of liquid ammonia and 0.470 kg. of sodium dehydrolinalylate were fed into a pipe reactor, by means of a positive displacement pump, at a rate of 700 grams per hour. The reactor was maintained at a temperature of 15° C. and at a pressure of 900 p.s.i.g. Concurrently, 3.400 kg. of methyl heptenone was fed at a rate of 315 grams per hour into the same pipe reactor, the reactor being maintained, at all times, at a temperature of 15° C. and at a pressure of about 900 p.s.i.g. As the reaction was completed, the reaction mixture was released to a pressure of about 300 p.s.i.g. The reaction mixture comprising 0.50 kg. of acetylene, 5.8 kg. of ammonia, 0.177 kg. of methyl heptenone, 3.88 kg. of dehydrolinalool, 0.043 kg. sundries and 0.470 kg. of sodium dehydrolinalylate was fed into an evaporator equipped with a film wiper adapted to work under high pressure. The bottom temperature of the evaporator was maintained at 120° C. and the condensation temperature at the top of the evaporator was maintained at 35° C. The pressure of the system was 220 p.s.i.g. The product, dehydrolinalool, was collected as a liquid from the evaporator. The yield of dehydrolinalool was 95 percent based on the weight of the methyl heptenone employed. The acetylene and ammonia vapors, which were released from the evaporator, were passed into a condensor and condensed at a temperature of about 30° C. at 215 p.s.i.g. The liquid condensate collected contained 5.7 kg. of ammonia and 0.5 kg. of acetylene and 0.2 kg. of sundries. The liquid condensate was ready for recycling back into the system.

By the very same procedure as described in the above examples employing 6,10,14-trimethylpentadecanone-2 as the ketone reactant, dehydroisophytol, i.e., 3,7,11,15-tetramethylhexadecyn-1-ol-3 was prepared. The dehydroisophytol reaction mixture can be pumped into a wiped film evaporator as described in the above examples to separate the desired dehydroisophytol product from the ammonia and acetylene in the reaction mixture.

I claim:
1. In a process for producing an acetylenic carbinol which comprises reacting in liquid phase an acetylenic hydrocarbon with a ketone, said reaction being carried out in liquid ammonia and in the presence of a catalytic quantity of an alkali metal acetylide catalyst or the alkali metal salt of an acetylenic carbinol at temperature above about minus 10° C. and at a pressure not below about 500 p.s.i.g., the reactants and the catalyst, throughout the reaction, being dissolved in said liquid ammonia, the improvement comprising subjecting the reaction mixture to thin film evaporation by passing it into an evaporation zone provided with a film wiper operating under superatmospheric pressures within the range at which the ammonia and unreacted acetylene can condense at from about 0° C. to about 60° C., distilling off ammonia and unreacted acetylene into a condenser, condensing the acetylene and ammonia vapors at a temperature of from about 0° C. up to about 60° C., venting uncondensed gases to maintain a desirable condensing pressure, and recycling the condensed ammonia and acetylene to the initial reaction step.

2. The process of claim 1 wherein the acetylenic hydrocarbon has the formula $$R-C\equiv CH$$

in which R is a member selected from the group consisting of hydrogen, lower alkyl, lower alkenyl, lower alkynyl, phenyl, and lower alkyl substituted phenyl and the ketone reactant has the formula $$\begin{array}{c}R_1\\ \phantom{R_1}\diagdown\\ \phantom{RRR}C=O\\ \phantom{R_1}\diagup\\ R_2\end{array}$$

in which $R_1$ is a member selected from the group consisting of lower alkyl, lower alkenyl and lower alkynyl; $R_2$ is a hydorcarbon radical having from 1 to 18 carbon atoms; and in which $R_1$ and $R_2$, taken together, represent a member selected from the group consisting of a cyclo-lower alkyl radical and a cyclo-lower alkenyl radical.

3. The process of claim 1 wherein the reaction mixture is preheated to a temperature of up to about 100° C. immediately prior to being passed into the evaporator.

4. The process of claim 1 wherein the acetylenic hydrocarbon reactant is acetylene, the ketone reactant is acetone and the acetylenic carbinol product of the reaction is methyl butynol.

References Cited

UNITED STATES PATENTS

| 2,049,486 | 8/1936 | Babcock | 203—91 |
|---|---|---|---|
| 2,203,363 | 6/1940 | Ralston | 260—638 |
| 2,302,345 | 11/1942 | Pesta et al. | 260—638 |
| 2,519,451 | 8/1950 | Fulton | 203—77 |
| 2,680,708 | 6/1954 | Cook | 203—4 |
| 2,925,363 | 2/1960 | Bavley et al. | 260—638 |
| 2,935,451 | 5/1960 | Troyan | 203—91 |
| 3,283,014 | 11/1966 | Balducci et al. | 260—638 |
| 3,054,729 | 9/1962 | Smith | 203—89 |
| 3,186,795 | 1/1965 | Fields et al. | 203—77 |
| 3,196,087 | 7/1965 | Lustenader | 203—89 |
| 3,266,555 | 8/1966 | Thier | 202—236 |

WILBUR L. BASCOMB, JR., Primary Examiner

U.S. Cl. X.R.

202—177; 203—89, 91, 4; 260—618, 617, 638, 643